United States Patent
Fitzgibbon et al.

(10) Patent No.: US 6,777,902 B2
(45) Date of Patent: Aug. 17, 2004

(54) ASYMMETRIC DRIVE MOTOR FOR A BARRIER OPERATOR OR THE LIKE

(75) Inventors: James J. Fitzgibbon, Batavia, IL (US); Edward T. Laird, Lombard, IL (US); Colin Willmott, Buffalo Grove, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/102,122

(22) Filed: Mar. 20, 2002

(65) Prior Publication Data

US 2003/0178962 A1 Sep. 25, 2003

(51) Int. Cl.[7] ................................................. G05B 5/00
(52) U.S. Cl. ...................... 318/466; 318/468; 318/266; 318/282; 318/286; 318/469; 49/26; 49/28
(58) Field of Search ............................. 318/466, 468, 318/280, 282, 283, 286, 751, 772, 774, 779, 794, 795

(56) References Cited

U.S. PATENT DOCUMENTS

| 3,725,757 | A |   | 4/1973  | Ehrens et al. |
|-----------|---|---|---------|---------------|
| 4,045,715 | A | * | 8/1977  | Umpleby et al. ............. 318/16 |
| 4,128,791 | A | * | 12/1978 | Katz .......................... 318/724 |
| 4,386,398 | A | * | 5/1983  | Matsuoka et al. .......... 364/167 |
| 5,162,718 | A |   | 11/1992 | Schroeder |
| 5,325,034 | A | * | 6/1994  | Reynolds .................... 318/782 |
| 5,404,088 | A | * | 4/1995  | Nanos ........................ 318/751 |
| 5,925,996 | A | * | 7/1999  | Murray ....................... 318/471 |
| 5,998,950 | A | * | 12/1999 | Fitzgibbon et al. ......... 318/280 |
| 6,118,243 | A | * | 9/2000  | Reed et al. ................. 318/468 |
| 6,172,475 | B1|   | 1/2001  | Fitzgibbon et al. |

* cited by examiner

Primary Examiner—Rina Duda
(74) Attorney, Agent, or Firm—Fitch, Even, Tabin & Flannery

(57) ABSTRACT

An asymmetrical drive motor and apparatus with the asymmetric drive motor driving a barrier. The asymmetric drive motor drives the barrier at different drive powers according to direction, time of travel, safety requirements or speed. The drive power is controlled by electrically changing the capacitance value for a permanent split capacitor motor.

18 Claims, 4 Drawing Sheets

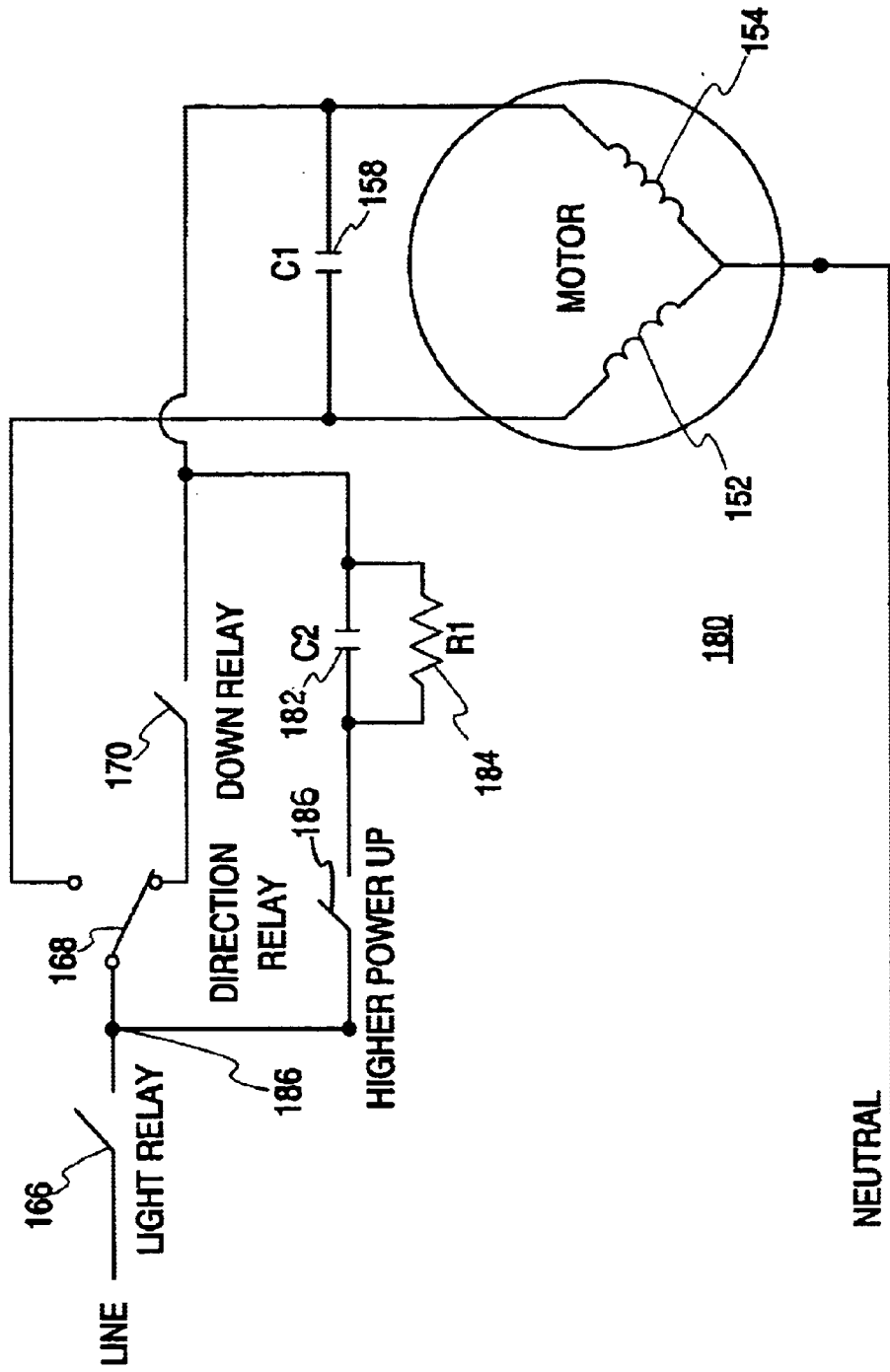

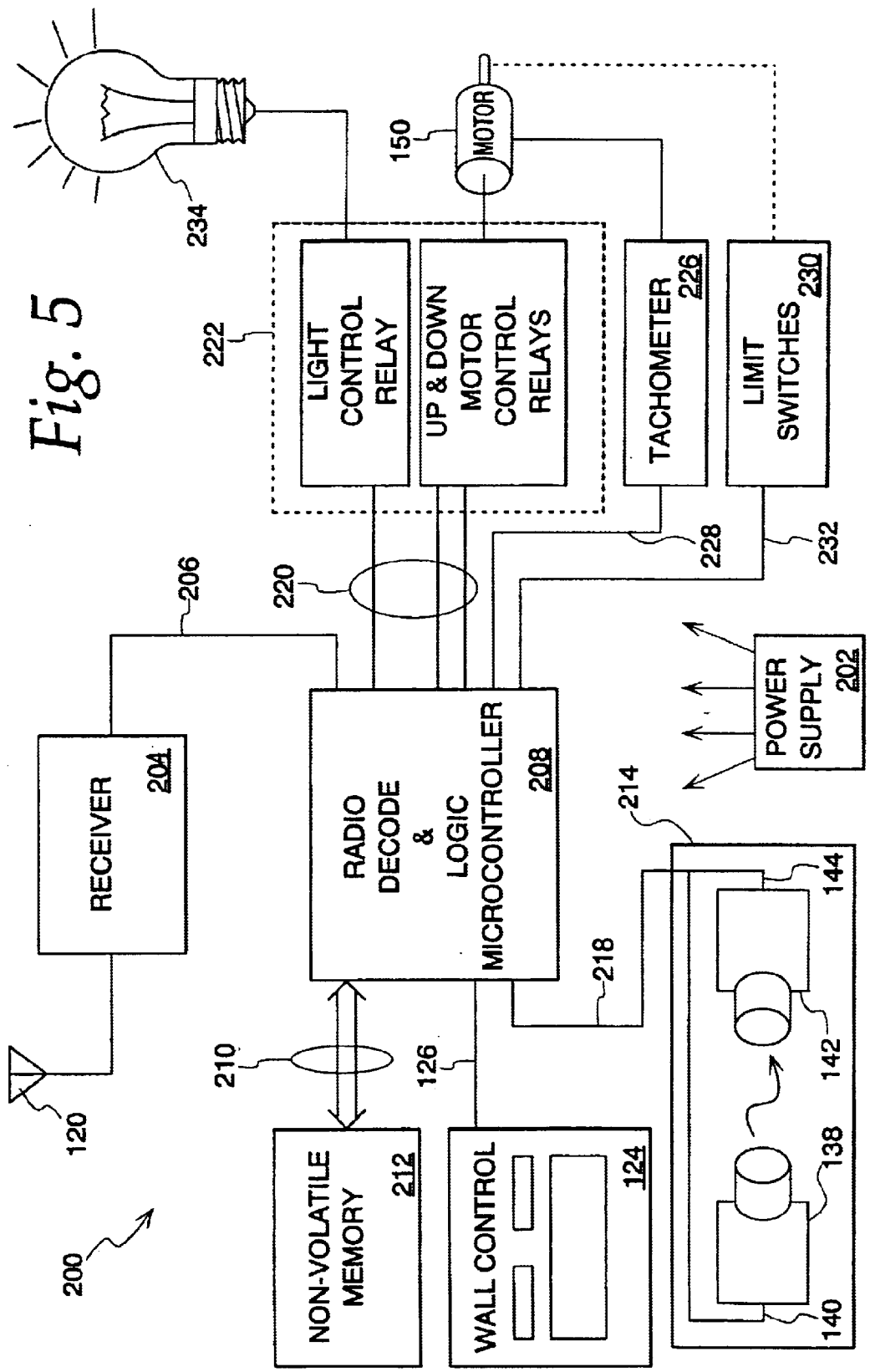

ASYMMETRIC DRIVE MOTOR FOR A BARRIER OPERATOR OR THE LIKE

BACKGROUND OF THE INVENTION

1. Field of the Invention

The present invention is related to a movable barrier and more particularly, to a motor for driving a movable barrier such as a garage door.

2. Background Description

Movable barrier operators and, more particularly, garage door operators are well known and have become very sophisticated to provide users with increased convenience and security. The amount of drive power for such a barrier operator is usually selected based on a trade off between the need for power to start and continue the door's motion and the noise and vibration generated by the motor, as well as the availability of electrical power. Generally, it is desirable to have a higher power to open the door due to ice and snow freezing the door down. Also, during safety initiated operations larger amounts of power may be desired to reverse or stop the barrier. A problem is that a higher power motor usually create larger levels of noise and vibration and require more electrical power and thus, generate more heat to operate for the same level of mechanical power.

For example, in a situation where the door has become extremely heavy such as when the door's counter balance spring has broken and the door is required to reverse, a low power motor which is adequate to keep a door in motion may not have enough power to overcome both the inertia of motion and the extreme weight of the door. Typically, in selecting a drive motor for a barrier operator, safety takes precedence over noise and vibration or operational electrical efficiency and, the motor is selected to open the garage door in all situations.

By contrast selecting a high power motor allows the operator to have enough power to lift the door even when the door's spring has broken. In this situation the high power operator has the ability to open the door but is often more inefficient and has higher levels of, noise and vibration.

The typical motor used in such a garage door operators is a single phase motor. A single-phase motor may be classified as a split phase motor, a permanent split capacitor (PSC) motor, a capacitor start-induction run motor or a capacitor start-capacitor run motor. Further, most single-phase induction motors require a switching arrangement for starting the motor, e.g., switching start windings, a start capacitor, a run capacitor or a combination thereof, to assist the motor in reaching full speed. Capacitor start motors have a start capacitor that is only used to start the motor.

Thus, there is a need for a motor than can have higher power during intervals that require it, yet switch to a lower power, to reduce electrical power requirement and noise and vibration.

SUMMARY OF THE INVENTION

The present invention is an asymmetric drive motor and apparatus with the asymmetric drive motor for opening and closing a moveable barrier. The asymmetric drive motor may drive for example, a garage door open at a first drive power and closed at a second drive power. The first drive power is greater than the second drive power. A motor control circuit receives control commands and controls the motor to provide the first drive power if barrier is being opened and at the second drive power if the barrier is being closed.

Accordingly, the asymmetric motor of the present invention has improved power control for selecting higher power or lower power. Further, momentary application of higher power is available if needed at the start of travel for example to overcome inertia or ice that may have frozen the barrier shut. In emergency situations such as when the barrier has encountered an object on closing higher power is available to quickly open the barrier. Further, a power can be adjusted in the motor depending on the load driven by the motor.

BRIEF DESCRIPTION OF THE DRAWINGS

The foregoing and other objects, aspects and advantages will be better understood from the following detailed preferred embodiment description with reference to the drawings, in which:

FIG. 3 is a second preferred embodiment asymmetric drive garage door motor which is substantially similar to the embodiment of FIG. 2;

FIG. 5 is an example of a controller controlling an asymmetric drive motor such as in FIG. 2.

DESCRIPTION OF THE PREFERRED EMBODIMENTS

Figure 1:
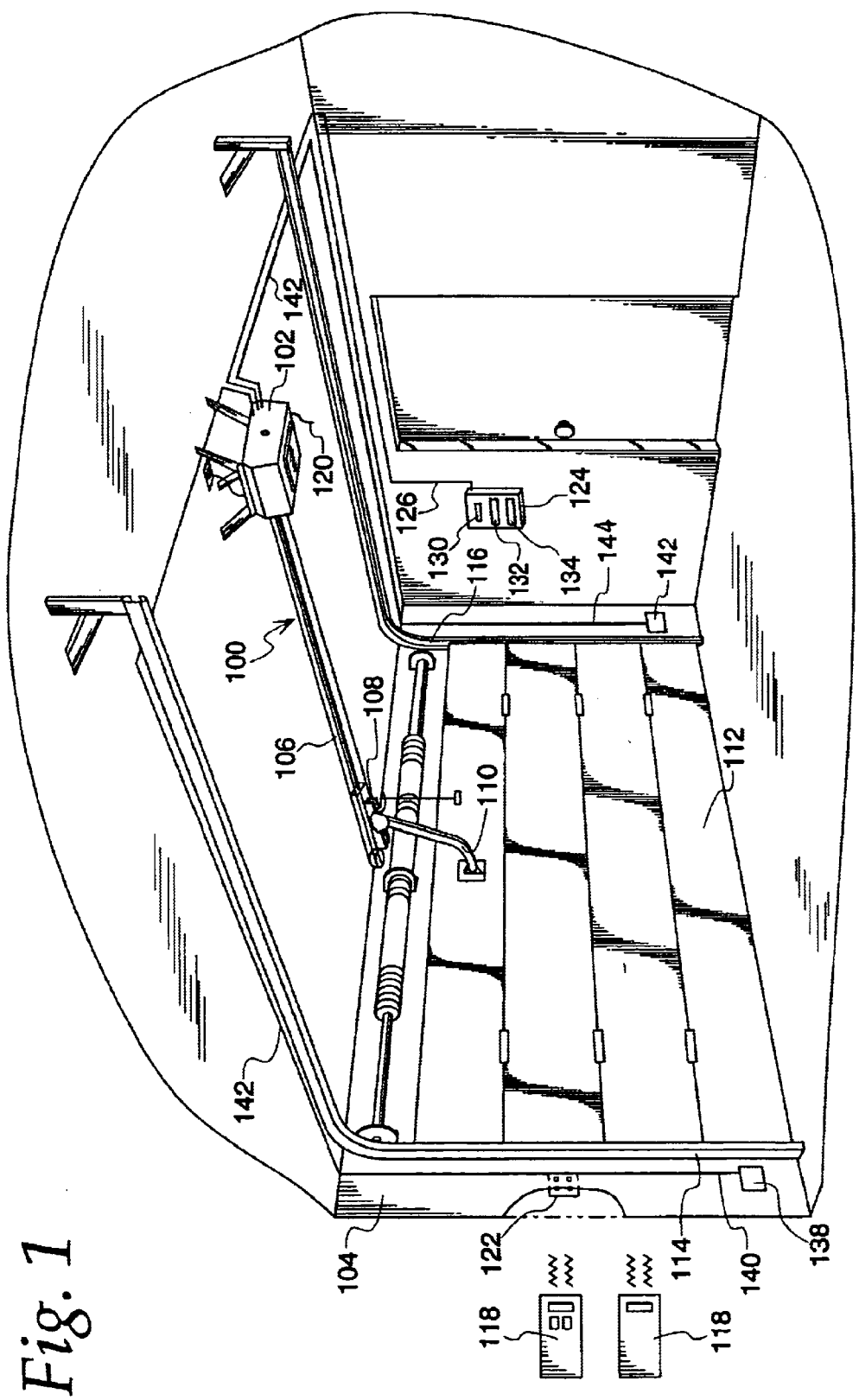
FIG. 1 shows an example of a movable barrier operator or garage door operator (GDO) according to the present invention.

Referring now to the drawings, and more particularly, FIG. 1 shows an example of a movable barrier operator or garage door operator (GDO) according to the present invention, generally referred to by numeral 100. The preferred GDO 100 includes a preferred embodiment asymmetric drive motor 150 (FIG. 5) and a control circuit 208 (FIG. 5) controlling GDO operation in a head unit 102 that is mounted to the ceiling of a garage 104. A rail 106 extends from the head unit 102. A trolley 108 is releasably attached to the rail 106 and includes an arm 110 extending to a multiple paneled garage door 112 positioned for movement along a pair of door rails 114 and 116. The GDO system 100 includes at least one hand-held remote control transmitter unit 118 adapted to send signals to an antenna 120 on the head unit 102. Signals from the antenna 120 are provided to the control circuit in the head unit 102. An external remote control pad 122 is positioned on the outside of the garage and includes multiple buttons thereon for communicating via radio frequency transmission with the control circuit in the head unit 102. A wall switch module 124 is mounted on a wall of the garage. The wall switch module 124 is a wired remote control connected to the control circuit in the head unit 102 by a wire 126. The wall switch module 124 may include a light switch 130, a lock switch 132 and a command switch 134. An optical emitter 138, preferably emitting an infrared (IR) beam, is connected via a power and signal line 140 to the control circuit in the head unit 102. An optical detector 142, disposed opposite the optical emitter 138 and receiving the IR beam, also is connected by a wire 144 to the control circuit in the head unit 102. The optical detectors 138 and 142 serve to sense if an obstruction is present in the barrier opening.

Figure 2:
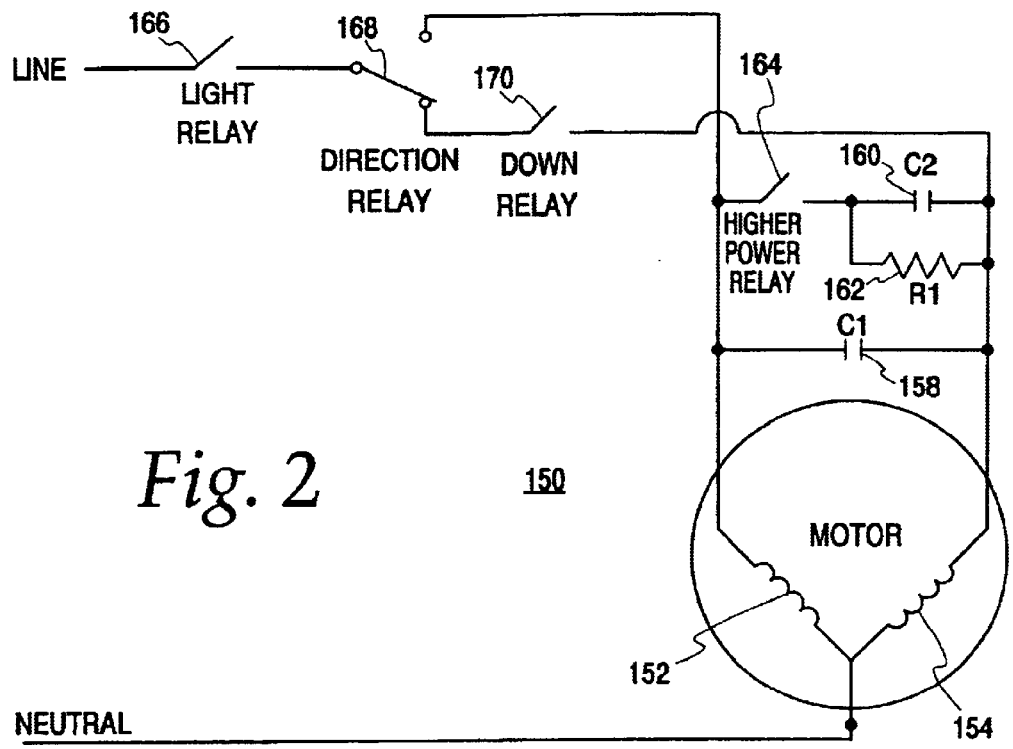
FIG. 2 shows a first preferred embodiment of asymmetric drive motor according to the present invention, which acts as a hybrid permanent split capacitor/capacitor start single phase motor with more power in one direction than in an opposite direction.

FIG. 2 shows a first preferred embodiment of asymmetric drive motor 150 according to the present invention, which acts a hybrid permanent split capacitor/capacitor start single phase motor with more or less drive power being selected by a controller of head unit 102. The motor 150 includes two coils or windings 152, 154 in the stator. The common connection of the two windings 152 and 154 is connected to ground or a neutral reference voltage terminal. Capacitor 158 is permanently connected across terminals at the opposite ends of the two windings 152, 154. A second capacitor 160 and parallel bleed resistor 162 are series connected with a relay 164 across first capacitor 158. Line current is provided through a light relay 166 to a direction relay 168 which selectively passes line current directly to either side of capacitor 158 and one of windings 152, 154. In this embodiment providing line current to winding 152 drives the garage door operator in the up direction. Down relay 170 passes line current to the motor at winding 154 only when the motor is driving the garage door down to close it.

When the garage door operator is activated to drive the door down, e.g., by pressing a button on a remote; the control circuit closes light relay 166; direction relay 168 remains in the position shown of FIG. 2; down relay 170 is closed; and, higher power relay 164 remains in its open position as shown in FIG. 2. Alternating line current is provided to coil 154 at capacitor 158. Capacitor 158 passes a current out of phase with the line current to coil 152. As a result, the motor 150 drives the garage door down at a first drive power level, e.g., ½ horsepower (hp). When the garage door is operator is activated, again, the control circuit closes light relay 166. However, direction relay 168 switches to the up position, down relay 170 remains open as shown in FIG. 2 and high power relay 164 is closed. Since directional relay is in the up position, line current is provided to coil 152 at capacitor 158 and capacitor 158 provides a current out of phase with the line current to inductor 154. With higher power relay 164 closed, effectively, capacitors 158 and 162 are in parallel to increase the drive power of the motor, e.g., from ½ hp to ¾ hp. Thus, the motor 150 drives the garage door open with 50% more power than is available for driving the garage door closed.

The control circuit may be programmed to keep the high power relay 164 closed for substantially the entire travel of the garage door, keep the high power relay 164 closed for a period of time or, as determined by the sensed speed of the motor 150. Thus, the high power relay 164 may be closed for a period of time to initially open the garage door. When the high power relay 164 opens, bleed resistor 162 discharges any charge remaining on second capacitor 160. Alternately, the control circuit 200 (FIG. 5) which includes a motor rotation sensor 226 may sense motor speed and keep the high power relay closed when the door is opening and until the motor reaches a pre-selected speed for a start capacitor-like operation. Also, in emergency situations, e.g., when an object is encountered by the closing garage door or an obstruction is sensed by optical detectors the controller may reverse the travel of the door. At such direction reversal the high power relay 164 is activated when the motor 150 reverses to drive the motor at high power for opening the garage door to recover from the emergency. In addition, the high power relay 164 may be closed to recover from a falling door situation, i.e., when the control circuit detects the door is falling, the motor is activated to keep it from hitting the floor.

FIG. 3 is a second preferred embodiment asymmetric drive garage door motor 180 which is substantially similar to the embodiment of FIG. 2. Accordingly, in FIG. 3 like elements are labeled identically. In this embodiment the second capacitor 182 and parallel bleed resistor 184 are series connected with higher power relay 186 across the direction relay 168 and down relay 170. Since the higher power relay 186 is energized when the motor 180 is raising the garage door, operation is substantially identical to the above description for operation of the motor 150 of FIG. 2, especially for lowering the garage door. When the door is closed and a button on a remote is pressed to cause the control circuit to activate the motor to open the door, the control circuit closes light relay 166 and switches direction relay 168 in its up position; down relay 170 remains open; and, high power relay 184 is closed. Again, with both the high power relay 186 closed and the direction relay 168 in its up position, the second capacitor 182 is essentially in parallel with the first capacitor 158, boosting power of the motor substantially as in the embodiment of FIG. 2. When higher power relay 186 is opened, any remaining charge across second capacitor 182 discharges through bleed resistor 184. With this embodiment also, the higher power relay 186 may be closed then opened again at the beginning of the opening door travel or during an emergency situation. Alternately, higher power relay 186 may be held on until the motor 180 reaches a selected minimum speed.

Figure 4:
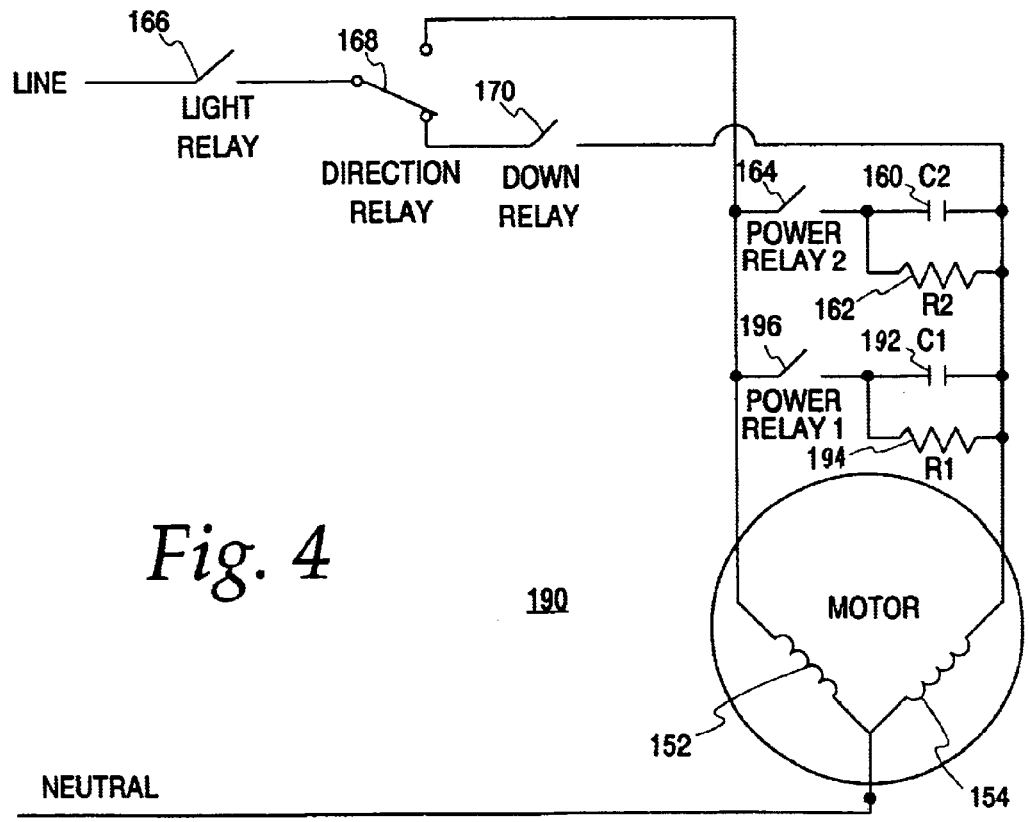
FIG. 4 is a third preferred embodiment asymmetric drive motor substantially similar to the first two embodiments of FIGS. 2 and 3 with like elements labeled identically.

FIG. 4 is a third preferred embodiment asymmetric drive motor 190 substantially similar to the first two embodiments of FIGS. 2 and 3 with like elements to FIG. 2 labeled identically. In this embodiment both the first capacitor 192 and the second capacitor 160 are switched in by power relays 196 and 164, respectively. Each capacitor 192, 160 has a parallel respective bleed resistor 194, 162. Thus, this embodiment has three selectable drive power levels determined by the first capacitor 192, the second capacitor 160 and the sum of the two capacitors 160, 192. The power level is selected by closing the appropriate one of power relay 164, 196 or the combination thereof. This embodiment may provide increased power on demand, e.g., selecting both capacitors 160, 192 when initially opening the garage door. Also, power can be controlled and provided as needed, e.g., when one capacitor 160 or 192 is switched in and the control circuit detects that the garage door is slowing down, the other capacitor 192, 160 may be switched in or substituted to boost motor drive. In response to the additional drive power, the drive motor 190 drives the door back to the minimum speed and then reduces power by opening one of switches 164 and 192.

FIG. 5 is an example of a controller 200 controlling an asymmetric drive motor 150 such as in FIG. 2. The controller 200 is powered by a power supply 202 that converts alternating current from an alternating current source, such as 110 volt AC, to required levels of DC voltage. The controller 200 is mounted in the head unit, e.g., head unit 102 of FIG. 1, with antenna 120 attached to receiver 204 which is coupled via a line 206 to supply demodulated digital signals to a microcontroller 208. The microcontroller 208 is also coupled by a bus 210 to a non-volatile memory 212, which stores user codes, and other digital data related to the operation of the control unit 200. Emitter 138 and infrared detector 142 form an obstacle detector 214 and power and signal lines 140, 144 form an obstacle detector bus 218 connected to microcontroller 208. The obstacle detector bus 218 includes lines 140 and 144. The wall switch module 124 is connected via wire 126 to the microcontroller 208. The microcontroller 208, in response to switch closures and received codes, sends signals over a relay logic, line 220 to a relay logic module 222 connected to asymmetric drive motor 150 which has a power take-off shaft (not shown)

from the rotor coupled to the transmission of the garage door operator 100 of FIG. 1. A tachometer 226 is coupled to the asymmetric drive motor 150 and provides an RPM signal on a tachometer line 228 to the microcontroller 208; the tachometer signal provides an indication of the speed at which the door is being driven. The apparatus also includes up and down limit switches 230, respectively sensing when the door 112 is fully open or fully closed. The limit switches 230 are connected to microcontroller 208 by leads 232. A light 234 is controlled by microcontroller 208 through logic module 222.

Accordingly, the asymmetric motor of the present invention has improved power control for selecting higher power or lower power depending on a direction of travel of the garage door. Further, momentary application of higher power is available if needed at the start of travel for example to overcome inertia or ice that may have frozen the garage door shut. Higher power is available in emergency situations such as when the door has encountered an object on closing, higher power is available to quickly open the door. Further, a power can be adjusted in the motor depending on the load driven by the motor and depending on the sensed speed of the motor. In the preceding embodiments the switches for controlling motor activation are shown as relays. Such relays may be replaced by other devices such as semiconductor triacs in other embodiments.

The embodiments described include a motor having a pair of windings with a neutral tap at a common winding terminal. The control principles discussed herein are not limited to such a winding configuration, but may apply to any motor configuration capable of producing two or more levels of power output. For example, but not by limitation, the motor could comprise multiple serially energized windings which can be individually removed from providing substantial motive force by switching arrangements such as by shorting across the terminals of individual windings. Further, the increase of power output as well as phase shifting could be performed by reactive components other than capacitors, such as inductors.

Having thus described preferred embodiments of the present invention, various modifications and changes will occur to a person skilled in the art without departing from the spirit and scope of the invention. It is intended that all such variations and modifications fall within the scope of the appended claims. Examples and drawings are, accordingly, to be regarded as illustrative rather than restrictive.

What is claimed is:

1. A motor for driving a movable barrier operator, said motor comprising:

a rotor capable of rotating in a first and a second direction;

a stator, said stator comprising a first winding and a second winding, said first winding and second winding connected at one end to a neutral motor terminal;

a first capacitor coupled across winding terminals at an other end of each of said first winding and said second winding;

a direction control selectively passing alternating current (AC) to either side of said first capacitor to selectively rotate the rotor in the first or the second direction;

a second capacitor selectively coupled across said first capacitor when AC is provided to one side of said first capacitor and disconnected from said first capacitor when AC is provided to a second side of said first capacitor to control the amount of power delivered by the motor;

an apparatus for sensing motor speed; and a controller responsive to the sensed motor speed for controlling the selective coupling of the second capacitor.

2. A motor in accordance with claim 1 comprising apparatus for sensing the direction of rotation of the rotor and for controlling the selective coupling of the second capacitor.

3. A motor for driving a movable barrier operator, said motor comprising:

a rotor capable of rotating in a first and a second direction;

a stator, said stator comprising a first winding and a second winding, said first winding and second winding connected at one end to a neutral motor terminal;

a first capacitor coupled across winding terminals at an other end of each of said first winding and said second winding;

a direction control selectively passing alternating current (AC) to either side of said first capacitor to selectively rotate the rotor in the first or the second direction;

a second capacitor selectively coupled across said first capacitor when AC is provided to one side of said first capacitor and disconnected from said first capacitor when AC is provided to a second side of said first capacitor to control the amount of power delivered by the motor;

apparatus for sensing a time for which the motor has been in motion; and a controller is responsive to the sensed time for controlling the selective coupling of the second capacitor.

4. A motor for driving a movable barrier operator, said motor comprising:

a rotor capable of rotating in a first and a second direction;

a stator, said stator comprising a first winding and a second winding, said first winding and second winding connected at one end to a neutral motor terminal;

a first capacitor coupled across winding terminals at an other end of each of said first winding and said second winding;

a direction control selectively passing alternating current (AC) to either side of said first capacitor to selectively rotate the rotor in the first or the second direction;

a second capacitor selectively coupled across said first capacitor when AC is provided to one side of said first capacitor and disconnected from said first capacitor when AC is provided to a second side of said first capacitor to control the amount of power delivered by the motor; and wherein the motor is connected to move a barrier and comprising an apparatus for sensing a distance of travel of the barrier and a controller for controlling the selective coupling of the second capacitor according to the distance of travel.

5. A motor as in claim 1 further comprising:

a light relay selectively passing AC to said direction controller when said motor is energized; and said direction controller passing AC from said light relay to a selected one of said one side and said second side of said first capacitor.

6. A motor as in claim 5 further comprising:

a down relay connected between said direction relay and said second side, said down relay passing current to said second side of said first capacitor when said down relay is energized; and a higher power relay series connected with said second capacitor.

7. A motor as in claim 6 further wherein:
said higher power relay and said down relay are energized mutually exclusively.

8. A motor as in claim 7 wherein said down relay is connected between said direction controller and said second side of first capacitor, said high power relay and said direction controller being coupled to said one side of said first capacitor.

9. A motor as in claim 8 wherein said first capacitor is series connected at said one side with a second high power relay and further including a bleed resistor parallel connected with each of said first capacitor and said second capacitor, wherein at least one of said down relay, the first said high power relay and said second high power relay always being de-energized.

10. A motor as in claim 8 wherein one end of said series connected high powered relay and said second capacitor is connected between said light relay and said direction controller and to said second end of said first capacitor.

11. A movable barrier operator including a motor for driving a movable barrier operator, said motor comprising:

a rotor capable of rotating in a first and a second direction;

a stator, said stator comprising a first winding and a second winding, said first winding and second winding connected at one end to a neutral motor terminal;

a first capacitor coupled across winding terminals at an other end of each of said first winding and said second winding;

a direction control selectively passing alternating current (AC) to either side of said first capacitor to selectively rotate the rotor in the first or the second direction;

a second capacitor selectively coupled across said first capacitor when AC is provided to one side of said first capacitor and disconnected from said first capacitor when AC is provided to a second side of said first capacitor to control the amount of power delivered by the motor; and whereby said motor provides power at a first drive power level for driving said movable barrier operator into a first open position and at a second drive power level for driving to a closed position, said first drive power level being greater than said second drive power level.

12. An apparatus for opening and closing a garage door comprising:

an alternating current asymmetric drive motor driving a garage door open at a first drive power and dosed at a second drive power;

a motor control circuit selecting drive power for said asymmetric drive motor responsive to door control commands and an indication that said garage door is being opened or closed, said first drive power being greater than said second drive power; and wherein said asymmetric drive motor comprises:

a rotor;

a stator, said stator comprising a start winding and a drive winding, said start winding and drive winding connected at one end to a neutral motor terminal;

a first capacitor coupled across winding terminals at an other end of said start winding and said drive winding;

a direction switch selectively passing alternating current (AC) to either side of each of said first capacitor responsive to said motor control circuit; and a second capacitor coupled across said first capacitor to select said first drive power, AC being provided to one side of both said first capacitor and said second capacitor, responsive to said motor control circuit.

13. An apparatus as in claim 12, said asymmetric drive motor further comprising:

a light relay selectively energizing a light and passing AC to said direction relay when said motor is energized responsive to said motor control circuit;

said direction switch passing AC from said light relay to a selected one of said one side and a second side of said first capacitor responsive to said motor control circuit, said second capacitor being disconnected when AC is passed to said second side.

14. An apparatus as in claim 13 further comprising:

a down relay connected between said direction relay and said second side, said down relay passing current to said second side of said first capacitor when said down relay is energized:

a high power relay series connected with said second capacitor, said motor control circuit mutually exclusively energizing either of said higher power relay and said down relay.

15. An apparatus as in claim 13 wherein said down relay is connected between said direction relay and said second side of said first capacitor, said higher power relay and said direction relay being coupled to said one side of said first capacitor.

16. An apparatus as in claim 15 wherein said first capacitor is series connected with a second higher power relay, and further including a bleed resistor parallel connected with each of said first capacitor and said second capacitor, said motor control circuit maintaining at least one of said down relay, the first said higher power relay and said second higher powered relay deenergized.

17. An apparatus as in claim 15 wherein one end of said series connected high powered relay and second capacitor are connected at one end to said light relay and said direction relay and at another end to said second end of said first capacitor.

18. An apparatus as in claim 12 further comprising a sensor sensing garage door rate of travel.

* * * * *